United States Patent [19]

Hutson

[11] 4,296,477

[45] Oct. 20, 1981

[54] REGISTER DEVICE FOR TRANSMISSION OF DATA HAVING TWO DATA RANKS ONE OF WHICH RECEIVES DATA ONLY WHEN THE OTHER IS FULL

[75] Inventor: Maurice L. Hutson, Vadnais Heights, Minn.

[73] Assignee: Control Data Corporation, Minneapolis, Minn.

[21] Appl. No.: 95,698

[22] Filed: Nov. 19, 1979

[51] Int. Cl.³ .................... G06F 13/00; G11C 19/00
[52] U.S. Cl. .............................. 364/900; 235/92 CC; 365/78; 307/221 R
[58] Field of Search ... 364/200 MS File, 900 MS File; 365/78; 307/221 R; 235/92 CC

[56] References Cited

U.S. PATENT DOCUMENTS

| | | | |
|---|---|---|---|
| 3,704,452 | 11/1972 | Beausoleil et al. | 364/900 |
| 3,727,204 | 4/1973 | de Koe | 364/900 |
| 3,742,466 | 6/1973 | Hamm et al. | 364/900 X |
| 3,745,535 | 7/1973 | de Koe et al. | 364/900 |
| 3,781,821 | 12/1973 | Roth | 364/900 |
| 3,988,601 | 10/1976 | Perry | 364/900 X |
| 3,992,699 | 11/1976 | Krumbach | 364/900 |
| 4,051,353 | 9/1977 | Lee | 364/900 |

Primary Examiner—James D. Thomas
Attorney, Agent, or Firm—William J. McGinnis; Joseph A. Genovese

[57] ABSTRACT

A register data transmission system has a plurality of register devices connected in series to form a data transmission link between a sending device and a receiving device. This register system can function between independent synchronous operating units of a computer such as a pair of data buffers. As data is transmitted, the individual register devices absorb the data as compactly as necessary within limits, to form the data path. Each register device has two data registers and two control flip-flops. The two data registers are the primary and secondary data rank registers. The secondary data rank register only receives data when the primary data rank register cannot receive data. The two control flip-flops are the primary and secondary full-bit flip-flops. Each register device has a clock control. In operation, data travels from the sending device through each register device to the receiving device while a control signal travels from the receiving device to the sending device. Data traveling through the register devices in a transmission path has a pattern analogous to a rippling effect because the timing sequence for the Hold signal from the receiving device travels in a reverse direction through the control flip-flops of the register devices to push the data along in stages. This rippling occurs as a result of each register device holding data in secondary data ranks when the receiving device stops data flow and while the sending device is shutting off.

31 Claims, 6 Drawing Figures

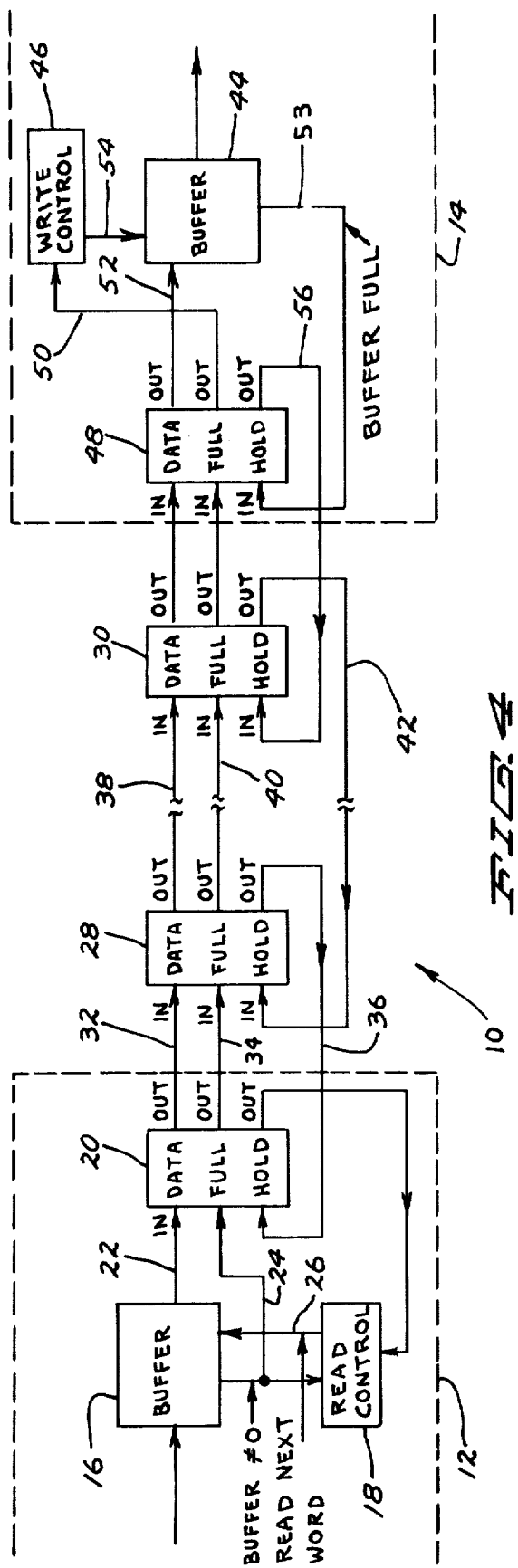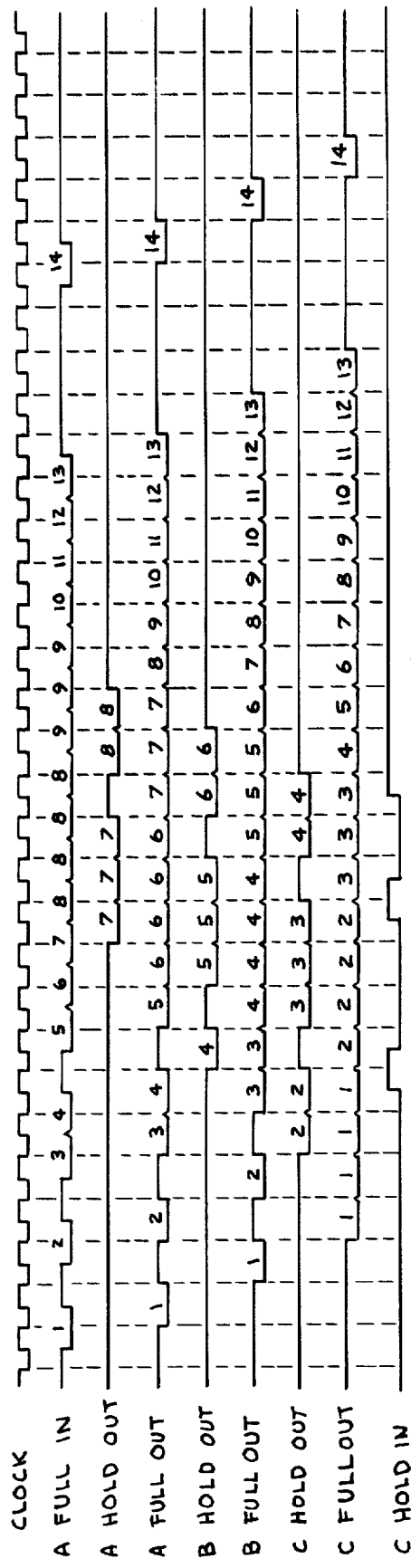

REGISTER DEVICE FOR TRANSMISSION OF DATA HAVING TWO DATA RANKS ONE OF WHICH RECEIVES DATA ONLY WHEN THE OTHER IS FULL

BACKGROUND OF THE INVENTION

This invention relates to a system for transmitting data from a first device to a second device where the two devices may operate independently. In particular, a ripple register system is shown which may operate between a first element of a computer and a second element of a computer or between an element of a computer and some peripheral device. Although the ripple register transmission path contains data in the process of transmission, it is not a buffer device as such but may be used as a transmission device between buffers.

A patent known to applicant and forming part of the prior art is U.S. Pat. No. 3,665,424. The present invention constitutes an improvement over the device shown in the patent in that data can be transmitted at each clock period whereas the device shown in the patent requires two internal clock cycles for each stage of data transfer. The patent shows a device which requires a completely empty stage just ahead of a data transmitting stage before data can be moved up. An advantage of the present invention is that with two data registers and two control flip flops in each ripple register device, a half-empty condition is recognized in the ripple register device in which the secondary data rank is empty so that data may be transferred from one device to the next at each clock cycle in recognition of the half-empty state. All of this will be explained in detail below. Other patents known to applicant in the prior art are U.S. Pat. Nos. 3,708,609 and 3,949,384.

Some prior art devices show systems requiring multiple clock inputs of different phases or on internally generated multi-phase clock for efficient data transfer. An advantage of the present invention is that only a single phase external clock signal is required for operation. This is not to limit the scope of the present invention if embodied in alternate forms using more than one clock signal for various reasons, however.

SUMMARY OF THE INVENTION

A ripple register transmission system consists of a plurality of individual ripple register devices connected between a source device and a receiving device. Each ripple register device consists of a primary data rank register and a secondary data rank register. In addition, each ripple register device has a pair of control flip flops called the primary and secondary full-bits because the condition of the flip flop is related to the associated data register. Both data registers in a ripple register device may be full at the same time. When data is received, it is received into either the primary or secondary data register. On receipt of the proper timing signal, the ripple register device transfers data from the primary data register to the succeeding device in the transmission path. If data is in the secondary data register, it will then enter the primary data register on receipt of some proper timing signal. Data never enters the secondary data rank register except when data is already in the primary register. Data does not enter the secondary register when data is being transferred out of the primary register, but rather, data can enter the primary register at essentially the same time as data is being transferred out. Thus, a ripple register is never completely empty for an entire clock cycle, as long as data is being transmitted in the data path to that ripple register. Only a single phase clock control is required for operation.

IN THE FIGURES:

FIG. 1 is a block schematic diagram of a ripple register transmission system according to the present invention.

FIG. 4 is a timing chart showing different functions in the operation of the transmission path shown in FIG. 3.

DESCRIPTION OF THE PREFERRED EMBODIMENTS

Figure 2:
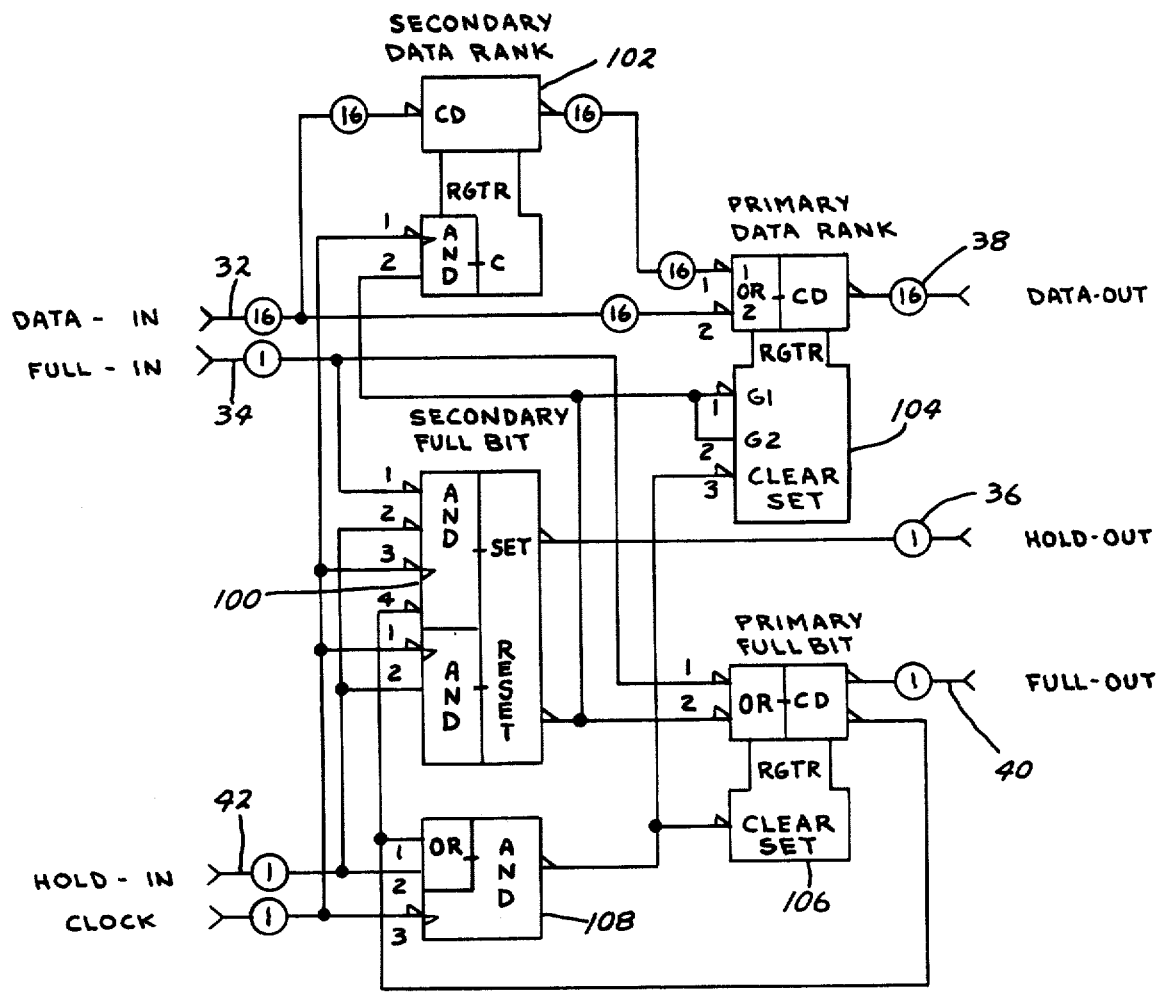
FIG. 2 is a detailed logic diagram of a single ripple register device of the type shown in FIG. 1 according to the present invention.

Referring now to FIG. 1, a ripple register transmission system 10 according to the present invention is shown. A source device 12 is shown transmitting data through a transmission path to a receiving device 14. The start of the transmission path from source device 12 includes a ripple register device 28, any number of additional ripple register devices, not shown, and a final ripple register device 30 just prior to the receiving device 14. However, for simplicity, FIG. 1 will hereafter be referred to as if devices 28 and 30 are directly connected.

The transmission path theoretically only requires a single ripple register device between the source and the receiver elements. However, the source device 12 and the receiving device 14 each require a special ripple register connection device for communication with the transmission link. These are shown internally in both the source and receiving device, as will be explained, but the source and receiver could be connected directly together because the single ripple register is constituted internally.

The source device 12 consists of a data buffer 16 having an input source of data. The buffer 16 is responsive to read data signals received from a read control gate 18. Read control signals are transmitted from the read control gate 18 to the buffer 16 on line 26. The buffer 16 provides data to a source located ripple register device 20 on transmission line 22. A data Full signal is connected from buffer 16 to device 20 and read control gate 18 on control line 24. Each ripple register device is labelled as having data lines "in" and "out" as well as Full and Hold "in" and "out" lines respectively. Full-out here corresponds to primary data register Full-out and Hold-out corresponds to secondary data register Full-out. Thus, the ripple register device located in the source 12 is connected by a data "out" line 32 to the first ripple register device 28 in the transmission path. The device 20 has its Full output line connected to the input line for Full in device 28 by control line 34. Conversely, the Hold "out" line of receiving ripple register device 28 is connected by control line 36 to the Hold "in" line of transmitting device 20.

Similarly, ripple register device 30 receives data "in" on line 38 from device 28, Full control signals on its Full "in" line 40 and sends Hold "out" signals on line 42 to device 28.

Finally, the receiving device 14 contains a receiving ripple register device 48. The output Hold line 56 of device 48 is connected to the Hold "in" line of device 30. The data "out" line of device 48 is connected by line 54 to a data buffer 44 which transmits data further in the receiving device. A buffer "Full" line 53 within the receiving device indicates an unreadiness to receive data. Write control device 46 is responsive to the Full output from device 48 on line 50. The write control device 46 is connected by control line 54 to buffer 44.

Referring now to FIG. 2, a detailed logic schematic of ripple register device 28 in the transmission path of FIG. 1 is shown. Data "in" line 32, Full "in" line 34 and Hold "in" line 42 as well as a clock input are shown to relate the device shown in FIG. 2 to FIG. 1. Similarly, data "out" line 38, Hold "out" line 36 and Full "out" line 40 are shown as in FIG. 1. Device 28 consists of a primary data rank register 104 and a secondary data rank register 102. A flip flop 106 functions as the primary full bit while a second flip flop 100 functions as the secondary full bit. Clocking of the primary data rank and primary Full bit is handled by clock control device 108.

Referring now to FIG. 2 in detail, secondary data rank register 102 is a set of 16 identical registers symbolized by the upper square using conventional standard logic symbols. The lower part of symbol 102 is a control diagram that's common to all 16 bits in this register.

In the bottom left corner of the secondary data rank register 102 are two inputs. Input 1 is the clock and the small triangle symbol inside the square shows a pulse edge trigger corresponding to timing charts of FIGS. 4 and 6. This control goes active as the clock goes from a high to a low. Thus, the AND gate is made when input one goes from a high to a low. Input 2 is active when high. Therefore, the control line C coming out of the AND gate symbol is only made if input 2 is high and input 1 is going from a high to a low on that pulse edge. At that time, the control output C is active. Data on the input lines of the register is clocked into the register only at times when control output C is active.

The primary data rank register 104 has two inputs for data shown in the upper part of the symbol. The OR gate for data inputs go active corresponding to the G1 and the G2 input lines shown in the control portion of the symbol at the bottom of the register. If the control G1 is active, input 1 to the data rank would be made if the input into G1 is low. Input G2 is active if it's high. Input 3 for the control portion of register 104 is the clock. The clock activates the transfer into the data register symbolized by CD at the top of the symbol.

The secondary full bit 100 is a single flip flop. The symbol shows that the flip flop is set by the AND gate in the upper square on the left side. The flip flop is reset or cleared by the AND gate in the lower box on the left side of the symbol. Starting with input 1 in the Set AND gate, the AND gate is made if that input is low and if input 2 is low. The AND gate would be made on the edge of the pulse on input 3 going from a high to a low. The gate is made if input 4 is low.

The Reset AND gate for flip flop 100 is made if input 1 is going from a high to a low and if input two is high. Flip flop 100 simply follows these two AND gates to either Set the flip flop or to Reset it.

The primary full bit 106 has two inputs into the flip flop shown by input one and input two at the top of the symbol. These inputs are active if low into the OR gate. The transfer into the flip flop or CD portion of the symbol is made by the control term at the bottom of the symbol which is made when the input is low.

The clock control 108 has three inputs, feeds an OR gate making the OR gate active if the input is high. Input 2 also controls the same OR gate. Again, the OR gate is active if input 2 is high so that if either input is high, the OR gate is active. The third input is an edge trigger. That input is an edge gate when the input goes from a high to a low. The AND gate for the output of clock 108 is made when input 3 is going from a high to a low and either input 1 or input 2 are high.

Figure 3:
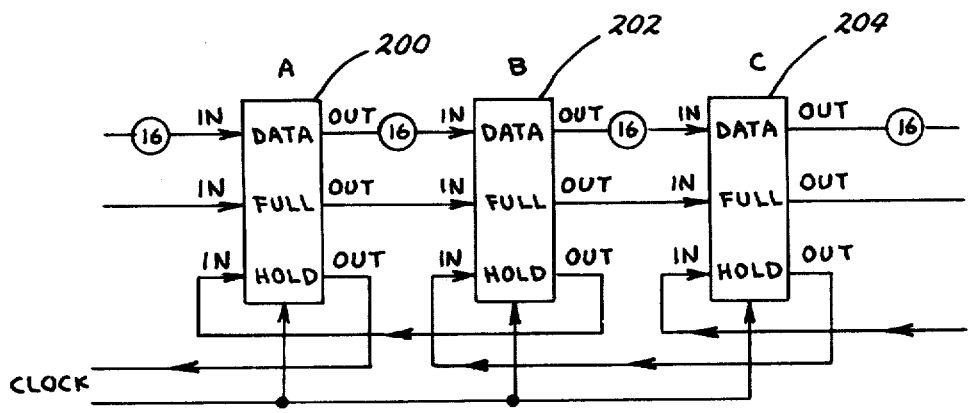
FIG. 3 is a schematic representation of three ripple register devices in a transmission path according to the present invention.

Referring now to FIG. 3, individual ripple register devices 200, 202 and 204 are shown in a continuous transmission path which extends continuously in both directions, hypothetically, from the figure as shown. The devices are labelled in a fashion consistent with the labelling shown as on FIG. 1 and FIG. 2 and a clock signal is included as on FIG. 2. FIG. 4 is labelled as a timing diagram with respect to all of the inputs and outputs shown in FIG. 3. Device 200 corresponds to device A and B to 202 and C to 204, respectively.

The operation of a ripple register system according to the present invention and with reference to the present figures will now be described.

The idea of using extra storage or buffers to aid the process of transferring data between two physically separate data handling apparatuses is old. Implementation of this buffering as in the present invention is new. Basic to the implementation is the fact that each ripple register device consists of two data registers and two control flip flops together with a single clocking control device. With respect to a single ripple register device for example, device 28 as shown in detail in FIG. 2, the following characteristics apply. The primary data rank 104 and the primary full bit control flip flop 106 will always perform a cycle on the next clock if the primary full bit 106 is clear, that is high, regardless of the state of the Hold "in" control line 42. The secondary data rank register 102 receives and saves data on the next clock only if the secondary is empty and the primary data rank 104 is full of data and the Full "in" control line 34 and the Hold "in" control line 42 are set low. Secondary data rank 102 holds data until the Hold "in" control line 42 goes to the high state. Once the primary data rank 104 and the secondary data rank 102 are full, any additional data presented at the data "in" line 32 and the Full "in" line 34 is lost unless held on those lines until the secondary data rank 102 is empty for one clock cycle. New information never clocks into the primary data rank 104 or the secondary data rank 102 except after the secondary data rank has been empty for one clock cycle. These characteristics of the functioning of the ripple register device are useful for solving the ready/resume problems of data transfer existing in the prior art.

The ripple register may be analyzed in the following way to show how it provides a solution to ready/resume problems of data transfer. Given that a source device, for example 12 in FIG. 1, transmits data to a receiving device 14 the devices must be synchronous in that they have the same basic clock signal. If the data produced by device 12 comes to device 14 in bursts of solid data, that is where each clock cycle transmits new data, followed by voids or bubbles in the data, that is clock cycles with no new data. Thus, the bursts and voids may be basically random so far as the receiving device 14 may be designed since these are entirely a function of the internal workings of the source device 12. Thus, device 14 can absorb data as bursts of solid data, but must, due to the requirements of its own internal workings, on occasion pause for various reasons and stop receiving data. These pauses are random in the sense that they are completely external to the source device 12. Thus, the system requires that all data must be accepted by the receiving device 14 in its original order with no data lost and no provision for repeating lost data.

One solution to data transmission problems, relating generally to that found in the prior art and not shown in any of the figures of this application and not involving the use of a ripple register device, would have the requirement that the receiving device 14 would have to predict when it could receive data and how much. This would probably cause some concerns in data transfer which would be impossible to predict. Further, if the source device wasn't ready to send data during some of the times when the receiving device was ready, time would be lost with no data transmission at a time when it would be possible to receive data. In this event, the source device and the receiving device could take the form of two buffers of the same size. The size would be chosen to meet the requirements of the job for efficient transfer of data and for example the threshold of data transmission might be such that the first buffer in the first device might be one-half full at the time data would begin transmission.

Then, the following events could occur in this prior art example. The receiving device buffer might go from over one-half full to equal or less than one-half full because of data flow out of the buffer and into the receiving system. This information could be communicated back to the transmitting device on a control line. Then, when the source device receives the signal that the receiving device buffer is less than one-half full, the source device buffer will begin to transmit data so long as it is greater than or equal to one-half full and thus transmit one-half the contents of the source buffer data into the transmission path along with a control signal to cause the receiving buffer to receive this data. This prior art process can be repeated but there is a period of time during which the source buffer has partially emptied into the transmission path but before the receiving device has changed the state of its buffer capacity signal back to the source device. For this example, for each one-half buffer of data transferred, there is a period of no transmission and a period of overhead time lost to the system which could otherwise be used for data transmission. This time is a substantial number of clock cycles and depends on the data path length, the response of the receiving circuit to received control signals and the response of the transmitting circuit to return signals from the receiver. Theoretical analysis of this system shows that even with large capacity buffers allowing for long transmission times the efficiency can reach a high level, but efficiency can never reach 100% even hypothesizing an arbitrarily short transmission path and an arbitrarily large buffer storage capacity.

Now with reference to the present invention, a very high efficiency, in fact higher than that of the prior art, can be achieved using ripple register devices to devise a ripple register transmission path. These ripple registers will be distributed evenly along the data path and the same givens will be provided as for the prior art system requirements.

In reference to the prior art solution to the data transmission problem, the efficiency calculation did not allow for any lost transmission time due to the source device buffer being less than a certain predetermined percentage of full nor did it include time lost because the second receiving device buffer was too full to receive data. This is not to say that these events shouldn't be considered in an overall efficiency figure, but the transmission system efficiency calculation must work when either device is waiting on the other for the proper control signal.

In the prior art when the receiving buffer is less than one-half full, a control line is provided to protect the receiving buffer from overflowing but the efficiency of the system only is measured by the turnaround system for transmission of this system back to the transmitter plus the refill time for the transmission path. The buffers in the prior art example were always ready to transmit. The same logic is applied in the present invention and the inefficiency of the buffer devices is removed from the transmission scheme by assuming that the transmitting buffer is always ready to send and the receiving buffer is always ready to receive. The efficiency of the present solution can be 100% regardless of the size of the buffers in the transmitting or receiving devices or the length of the transmission path between them. To prove this, it can be shown with reference to the timing chart of FIG. 4 that the Hold signal which is passed from the last ripple register device through each preceding ripple register device originates as the receiving device buffer reaches a full state. However, it is assumed that the receiving device buffer is never full in this example. The Full signal on the succession of ripple registers is the result of the source device not being completely empty and is assumed to never happen and under these conditions data may move 100% of the time.

While studying the timing chart for the three ripple registers shown in FIG. 3, notice that the high state of the Hold signal travels in a reverse direction to the "data" and Full flow of signals. Anyone who has ever watched a snake crawl along the ground has seen how ripple in the body travels from the head to the tail and pushes the entire snake body forward. This is the visual effect of the high state of the Hold signal moving opposite to the data flow, and yet pushing it along.

The Hold "out" signal of ripple register 200 tells the sending device when more data can enter the transmission path. Ripple register device 200 is next to the sending device and can respond to each word sent and set the Hold flip flop to stop the next word to be sent.

The total length of the transmission path, that is the number of clock cycles of transmission, doesn't affect the data rate or the response time to control signals or the conditions with respect to the ready/resume problem in data transfer. The sending and receiving device buffers are not adversely affected by path length using this ripple register scheme.

Figure 5:
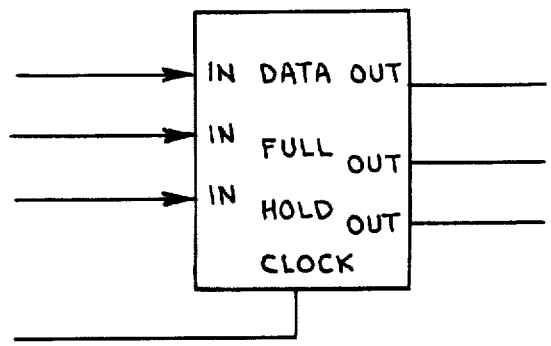
FIG. 5 is a schematic diagram of the connections to a single ripple register device.
Figure 6:
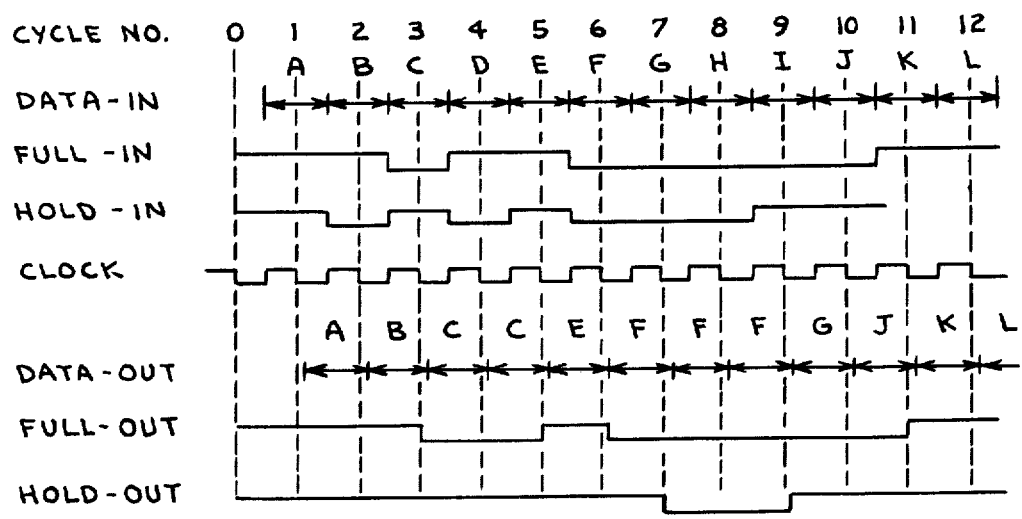
FIG. 6 is a timing chart of the device shown in FIG. 5 and forms a logical truth table to summarize the possible operating states of the device.

Referring now to FIGS. 5 and 6, a timing diagram for a single ripple register is presented to show the possible states it can assume in operation. This timing device of FIG. 6 refers to the ripple register of FIG. 5 and summarizes the invention in much the same way a logical truth table would. As a result of pulse edge gating, the primary data rank register may have data input at essentially the same time, that is during the same cycle, as data is transferred out. The following conditions characterize the ripple register:

1. The primary data rank and primary Full bit will always clock if the primary full bit is clear (hi), regardless of the state of the Hold line.
2. The secondary data rank saves data only if the primary data rank is full and Full "in" and Hold "in" are low. It holds that data until the Hold "in" goes high.
3. Once the primary and secondary data ranks are full, any additional data presented by Data "in" and Full "in", and not held up until the secondary rank is empty for one clock cycle, will be lost.
4. New information never clocks into the primary or secondary data rank except after the secondary data rank has been empty at least one clock cycle.

What is claimed is:

1. A ripple register device comprising:
   a primary data rank register having an output connected as the ripple register device data output,
   a secondary data rank register having a data output connected to an input of said primary data rank register,
   means for providing input data of the ripple register device as an input to said primary and secondary data rank registers,
   a first control means for providing a control signal to said primary and secondary data rank registers, said first control means with a first control signal input for connection to a preceding device in a data transmission path and said first control means with a second control signal input for connection to a succeeding device in a transmission path,
   a second control means for providing a control signal output, said second control means with a first control signal input connected to an output of said first control means and said second control means with a second control signal input for connection to a preceding device in a transmission path, and
   clock control means, having at least a clock signal input, for controlling gating of data from said primary data rank register to a succeeding device in a transmission path,
   wherein said ripple register device receives input data in said primary data rank register if said primary data rank register is initially empty and said ripple register device receives input data in said secondary data rank register if said primary data rank register is full.

2. The device of claim 1 wherein said first control means is a flip-flop.

3. The device of claim 1 wherein said second control means is a flip-flop.

4. The device of claim 1 or 2 or 3 wherein said first control means produces an output Hold signal for connection to a preceding device in a transmission path to cause said preceding device to hold data when said secondary data rank register contains data.

5. The device of claim 1 or 2 or 3 wherein said second control means produces an output Full signal for connection to a succeeding device in a transmission path when said primary data rank register contains data.

6. A data transmission system consisting of a plurality of identical ripple register devices adapted to be connected serially between a sending device and a receiving device in which each of said ripple register devices has a data "in" port and a data "out" port, a Hold "in" port connected to a succeeding device and a Hold "out" port connected with a preceding device and a Full "out" port connected with a succeeding device and a Full "in" port connected with a preceding device wherein said Full "out" port transmits information that the particular ripple register device is prepared to transmit data and wherein said Hold "out" port transmits information that the particular ripple register device cannot receive data, wherein each particular ripple register device has at least two data registers so that data may be both received and transmitted simultaneously in response to independent signals at the Full "in" and Hold "in" ports.

7. The transmission system of claim 6 wherein each ripple register device is comprised of:
   a primary data rank register having an output connected as the ripple register device data output,
   a secondary data rank register having a data output connected to an input of said primary data rank register,
   means for providing input data of the ripple register device as an input to said primary and secondary data rank registers,
   a first control means for providing a control signal to said primary and secondary data rank registers, said first control means with a first control signal input for connection to a preceding device in a data transmission path and said first control means with a second control signal input for connection to a succeeding device in a transmission path,
   a second control means for providing a control signal output, said second control means with a first control signal input connected to an output of said first control means and said second control means with a second control signal input for connection to a preceding device in a transmission path, and
   clock control means, having at least a clock signal input, for controlling gating of data from said primary data rank register to a succeeding device in a transmission path,
   wherein said ripple register device receives input data in said primary data rank register if said primary data rank register is initially empty and said ripple register device receives input data in said secondary data rank register if said primary data rank register is full.

8. The device of claim 7 wherein said first control means is a flip-flop.

9. The device of claim 7 wherein said second control means is a flip-flop.

10. The device of claim 7 or 8 or 9 wherein said first control means produces an output Hold signal for connection to a preceding device in a transmission path to cause said preceding device to hold data when said secondary data rank register contains data.

11. The device of claim 7 or 8 or 9 wherein said second control means produces an output Full signal for connection to a succeeding device in a transmission path when said primary data rank register contains data.

12. A ripple register device comprising:
   a clock signal source means for providing a single phase clock signal,
   a primary data rank register means having an output connected as the ripple register device data output,
   a secondary data rank register means having a data output connected to an input of said primary data rank register means and having a clock signal input for controlling timing of data transfers, means for providing input data of the ripple register device as an input to said primary and secondary data rank registr means, a first control means for providing a control signal to said primary and secondary data rank register means, said first control means with a first control signal input for connection to a preceding device in a data transmission path and said first control means with a second control signal input for connection to a succeeding device in a transmission path, said first control means having a clock signal input for controlling timing of output signals of said ripple register device, a second control means for providing a control signal output, said second control means with a first control signal input connected to an output of said first control means and said second control means with a second control signal input for connection to a preceding device in a transmission path, and a single phase clock control means, having at least a clock signal input, for controlling gating of data from said primary data rank register means to a succeeding device in a transmission path, said clock control means being connected to said primary data rank register means and to said second control means, wherein said ripple register device receives input data in said primary data rank register means if said primary data rank register means is initially empty and said ripple register device receives input data in said secondary data rank register means if said primary data rank register means is full.

13. The device of claim 12 wherein said first control means is a flip-flop.

14. The device of claim 12 wherein said second control means is a flip-flop.

15. The device of claim 12 or 13 or 14 wherein said first control means produces a Hold "out" signal for connection to a preceding device in a transmission path to cause said preceding device to hold data when said secondary data rank register means contains data.

16. The device of claim 12 or 13 or 14 wherein said second control means produces a Full "out" signal for connection to a succeeding device in a transmission path when said primary data rank register means contains data.

17. A data transmission system comprised of a plurality of identical ripple register devices adapted to be connected serially between a sending device and a receiving device in which each of said register devices has a data "in" port and a data "out" port, a Hold "in" port connected to a succeeding device and a Hold "out" port connected with a preceding device and a Full "out" port connected with a succeeding device and a Full "in" port connected with a preceding device wherein said Full "out" port transmits information that the particular ripple register device is prepared to transmit data and wherein said Hold "out" port transmits information that the particular ripple register device cannot receive data, wherein each particular ripple register device has at least two data registers so that data may be both received and transmitted simultaneously in response to independent signals at the Full "in" and Hold "in" ports and wherein each ripple register device is comprised of:

a clock signal source means for providing a single phase clock signal, a primary data rank register means having an output connected as the ripple register device data "out" port, a secondary data rank register means having a data output connected to an input of said primary data rank register means and having a clock signal input for controlling timing of data transfers, means for providing input data from said data "in" port as an input to said primary and secondary data rank register means, a first control means for providing a control signal to said primary and secondary data rank register means, said first control means with a first control signal input for connection to a preceding device in a data transmission path and said first control means with a second control signal input for connection to a succeeding device in a transmission path, said first control means having a clock signal input for controlling timing of output signals of said ripple register device, a second control means for providing a control signal output, said second control means with a first control signal input connected to an output of said first control means and said second control means with a second control signal input for connection to a preceding device in a transmission path, and a single phase clock control means, having at least a clock signal input, for controlling gating of data from said primary data rank register means to a succeeding device in a transmission path, said clock control means being connected to said primary data rank register means and to said second control means, wherein said ripple register device received input data in said primary data rank register means if said primary data rank register means is initially empty and said ripple register device receives input data in said secondary data rank register means if said primary data rank register means is full.

18. The device of claim 17 wherein said first control means is a flip-flop.

19. The device of claim 17 wherein said second control means is a flip-flop.

20. The device of claim 17 or 18 or 19 wherein the first control means produces a Hold "out" signal for connection to a preceding device in a transmission path to cause said preceding device to hold data when said secondary data rank register means contains data.

21. The device of claim 17 or 18 or 19 wherein said second control means produces a Full "out" signal for connection to a succeeding device in a transmission path when said primary data rank register means contains data.

22. A ripple register device comprising:

a primary data rank register means having an output connected as the ripple register device data output, a secondary data rank register means having a data output connected to an input of said primary data rank register means, means for providing input data of the ripple register device as an input to said primary and secondary data rank register means a first control means for providing a control signal to said primary and secondary data rank register means, said first control means with a first control signal input for connection to a preceding device in a data transmission path and said first control means with a second control signal input for connection to a succeeding device in a transmission path, a second control means for providing a control signal output, said second control means with a first control signal input connected to an output of said first control means and said second control means with a second control signal input for connection to a preceding device in a transmission path, and clock control means, having at least a clock signal input, for controlling gating of data from said primary data rank register means to a succeeding device in a transmission path, wherein said ripple register device receives input data in said primary data rank register means if said primary data rank register means is initially empty or if data is being transferred out of said primary data rank register means and said ripple register device receives input data in said secondary data rank register means if said primary data rank register means is full and will remain full.

23. The device of claim 22 wherein said first control means is a flip-flop.

24. The device of claim 22 wherein said second control means is a flip-flop.

25. The device of claim 22 or 23 or 24 wherein said first control means produces an output Hold signal for connection to a preceding device in a transmission path to cause said preceding device to hold data when said secondary data rank register means contains data.

26. The device of claim 22 or 23 or 24 wherein said second control means produces an output Full signal for connection to a succeeding device in a transmission path when said primary data rank register means contains data.

27. A data transmission system comprised of a plurality of identical ripple register devices adapted to be connected serially between a sending device and a receiving device in which each of said register devices has a data "in" port and a data "out" port, a Hold "in" port connected to a succeeding device and a Hold "out" port connected with a preceding device and a Full "out" port connected with a succeeding device and a Full "in" port connected with a preceding device wherein said Full "out" port transmits information that the particular ripple register device is prepared to transmit data and wherein said Hold "out" port transmits information that the particular ripple register device cannot receive data, wherein each particular ripple register device has at least two data registers so that data may be both received and transmitted simultaneously in response to independent signals at the Full "in" and Hold "in" ports and wherein each ripple register device is comprised of:

a primary data rank register means having an output connected as the ripple register device data output, a secondary data rank register means having a data output connected to an input of said primary data rank register means, means for providing input data from said data "in" port as an input to said primary and secondary data rank register means a first control means for providing a control signal to said primary and secondary data rank register means, said first control means with a first control signal input for connection to a preceding device in a data transmission path and said first control means with a second control signal input for connection to a succeeding device in a transmission path, a second control means for providing a control signal output, said second control means with a first control signal input connected to an output of said first control means and said second control means with a second control signal input for connection to a preceding device in a transmission path, and clock control means, having at least a clock signal input, for controlling gating of data from said primary data rank register means to a succeeding device in a transmission path, wherein said ripple register device receives input data in said primary data rank register means if said primary data rank register means is initially empty or if data is being transferred out of said primary data rank register means and said ripple register device receives input data in said secondary data rank register means if said primary data rank register means is full and will remain full.

28. The device of claim 27 wherein said first control means is a flip-flop.

29. The device of claim 27 wherein said second control means is a flip-flop.

30. The device of claim 27 or 28 or 29 wherein said first control means produces a Hold "out" signal for connection to a preceding device in a transmission path to cause said preceding device to hold data when said secondary data rank register means contains data.

31. The device of claim 27 or 28 or 29 wherein said second control means produces a Full "out" signal for connection to a succeeding device in a transmission path when said primary data rank register means contains data.

* * * * *